Oct. 31, 1950  J. L. TAAFFE  2,527,776
SLIDE RULE

Filed April 6, 1948  5 Sheets-Sheet 1

John Laurence Taaffe
INVENTOR.

Oct. 31, 1950   J. L. TAAFFE   2,527,776
SLIDE RULE
Filed April 6, 1948   5 Sheets-Sheet 3

John Laurence Taaffe
INVENTOR.

BY *Thomas A. O'Brien*
*and Harvey B. Jackson*
Attorneys

Oct. 31, 1950

J. L. TAAFFE 2,527,776

SLIDE RULE

Filed April 6, 1948

John Laurence Taaffe
INVENTOR.

BY
*Anna A. O'Brien*
*and Harvey B. Jackson*
Attorneys

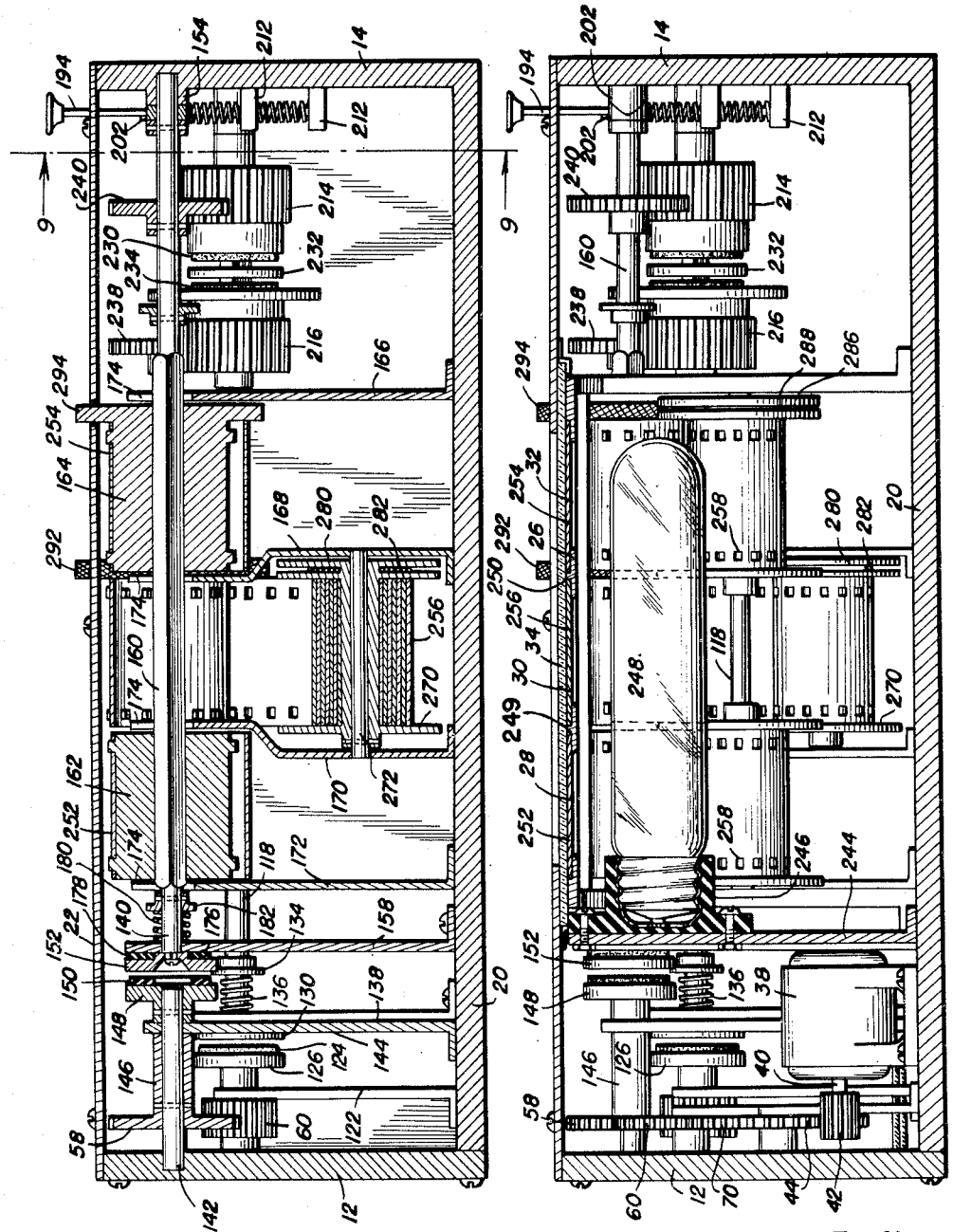

Patented Oct. 31, 1950

2,527,776

UNITED STATES PATENT OFFICE 2,527,776

SLIDE RULE

John Laurence Taaffe, Inglewood, Calif.

Application April 6, 1948, Serial No. 19,289

3 Claims. (Cl. 235—71)

This invention appertains to novel and useful improvements in calculators of the slide rule type.

An object of this invention is to obtain solutions to mathematical problems by improved mechanical means by moving an inside tape in either direction independently of a pair of flanking outside tapes; by moving the two outside tapes (having indicia thereon) together in either direction independently of the inside tape (having indicia thereon); and coupling the inside and outside tapes together and moving all three of them in either direction in accordance with the prerogative of the operator of the invention.

The nature of this invention is mechanical, including a housing having a gear train journaled therein, a motor for actuation of the gears in the train, means for journaling a plurality of reels in the housing, clutch elements in the reel and gear train system whereby selected reels may be rendered operative or, if desired, all of the reels may be rendered operative in unison, and means provided in the housing for rendering vision of the reels whereon pertinent indicia is supplied.

The features of the invention along with ancillary objects will become apparent to those skilled in the art, in following the description of the preferred form of the invention, illustrated in the accompanying drawings, wherein:

Figure 7 is a sectional view taken substantially on the line 7—7 of Figure 3;

Figure 8 is a sectional view taken on the line 8—8 of Figure 3;

Figure 9 is a fragmentary enlarged sectional view illustrative of the preferred cam actuation mechanism;

Figure 10 is a sectional view taken substantially on the line 10—10 of Figure 9;

Figure 11 is a perspective view of a window plate adapted to be utilized in association with the housing.

Figure 1:
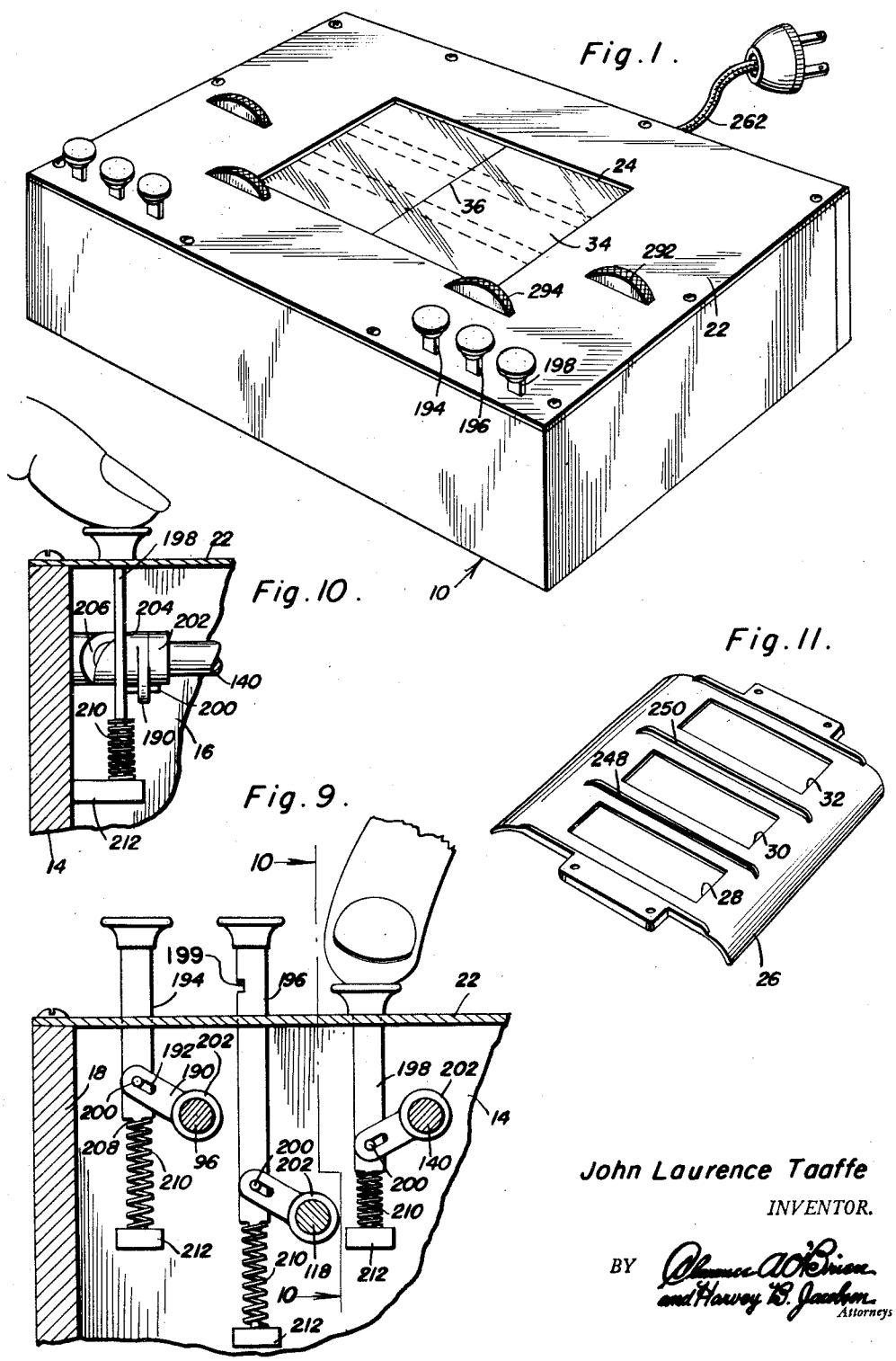
Figure 1 is a perspective view of the device.

This invention has been developed to provide a device for arriving at certain mathematical solutions in an improved matter. The use and function of a conventional slide rule is well known, and since the present invention incorporates the indicia of conventional slide rules, the same solutions obtainable on a slide rule are, therefore, obtainable by utility of the present invention.

Devices of the nature of the present invention are well known, it being one of the prime purposes of the present invention to supply improved means for actuating three tapes in selected directions, whereby the lining of the tapes adjacent a hair line or an index line may be obtained with accuracy, rapidly and by simple manipulation of a plurality of buttons similar to the type of buttons used in association with typewriters, linotype machines, and the like.

In the particular means for actuating the three tapes in either relatively opposite or in similar directions resides an important feature of the present invention.

A housing generally indicated at 10 is provided of any suitable material, preferably metallic, and includes side walls 12, 14 and 16, 18 as well as a bottom 20 and detachable cover 22. An aperture 24 is formed in the said cover 22 and has a window plate 26 secured therebeneath. This window plate has a plurality of slots 28, 30 and 32, respectively, formed therein, whereby vision may be had to the interior of the housing 10. Of course, the vision plate 26 is secured adjacent the said aperture 24 and a glass or other transparent closure 34 is positioned thereover. This glass may be formed with a hair line 36 extending transversely thereof to serve the usual function of the hair line. If it is found desirable, the ends of the slots 28, 30 and 32 may be utilized for the purpose of an index line.

Figure 4:
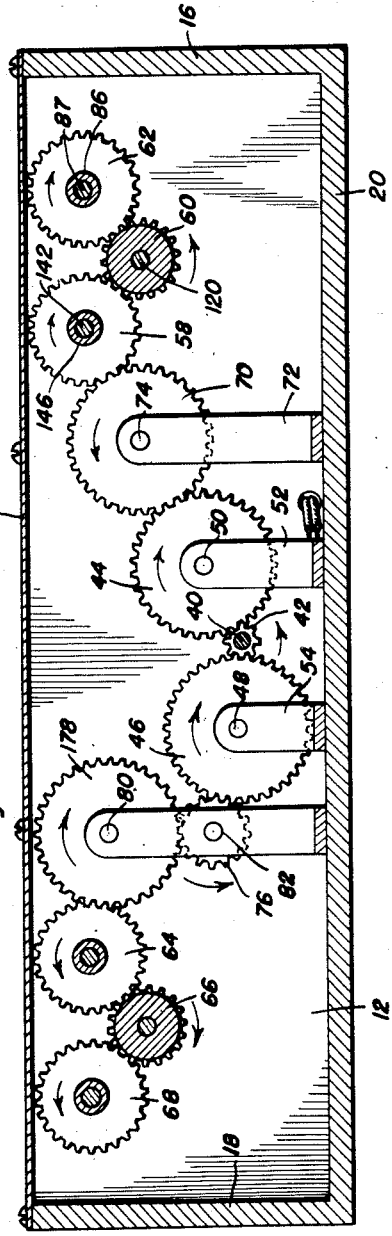
Figure 4 is a sectional view taken on the line 4—4 of Figure 2 and in the direction of the arrows.

Referring now primarily to Figure 4, a gear train is illustrated and includes a plurality of enmeshed conventional gears. A motor 38, preferably electrically operative, is supplied in the said housing 10, preferably attached to the bottom 20 thereof. The power shaft 40 extending from the motor has a pinion 42 secured thereto, which pinion is enmeshed with gears 44 and 46, respectively, of the said gear train. These last-mentioned gears 44 and 46 are journaled on suitable shafts 48 and 50 which are, in turn, journaled in the side 12 and suitable, conventional brackets 52 and 54. Thrust bearings 56 are supplied on the said shafts 48 and 50, respectively, and are maintained in place by any suitable means, preferably conventional set screws.

It is noted that due to a number of gears in the gear train and the positioning of the gears, the driving gears 58, 60 and 62, respectively, forming one set and the driving gears 64, 66 and 68, respectively, forming a second set of driving gears rotating in opposite directions. In order to attain this dissimilar rotation, a single gear 70 is journaled on a bracket 72, the said gear 70 being in mesh with the gear 44 and the said gear 58. Of course, the thrust bearing 56 and its appurtenant mechanism may be utilized in association with the journaling shaft 74 for the said gear 70. On the opposite side of the drive shaft 40 there is supplied two intermediate gears 76 and 78, in lieu of the single gear 70. The said gears 76 and 78 are enmeshed, the gear 76 being a pinion which is also engageable with the gear 46. The gears 76 and 78 are journaled on suitable shafts 80 and 82, respectively, which are mounted similar to the said shafts 48 and 50.

With the exception of the gear train described above and illustrated best in Figure 4, the preferred form of the invention (see Fig. 2) is symmetrical about a central transverse axis, and therefore a detailed description concerning certain operative elements for one side of the device will necessarily lead to a clear understanding of the opposite side.

Figure 5:
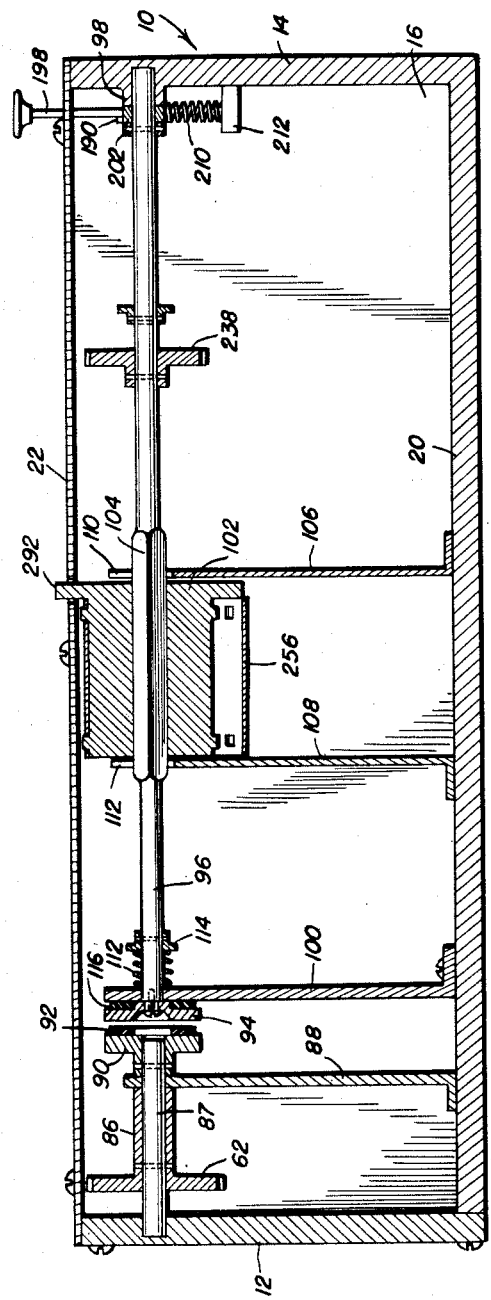
Figure 5 is a sectional view taken substantially on the line 5—5 of Figure 3.

Referring now to Figure 5, the gear 62 is readily ascertainable, and it will be seen that this particular gear has a sleeve 86 associated therewith, which is pinned or otherwise rigidly secured to a sleeve 87 journaled in a conventional bracket 88 and the wall 12. On the opposite side of the said bracket 88 there is supplied a boss 90 having a clutch element 92 rigidly secured thereto. This clutch element is supplied for cooperative engagement with a second clutch element 94 which is secured to the terminal portion of a shaft 96.

The said shaft 96 is journaled at its ends in a boss 98 formed in the said wall 14 and in a bracket 100 attached to the base or bottom 20 of the said housing 10. The said shaft 96 is specially configured to accommodate a reel 102, which is drivingly connected therewith. To effect this driving connection, the said shaft 96 has flats 104 formed thereon which cooperate with a complemental shape bore in the said reel 102. It will be noted at this point that the said shaft 96 is axially displaceable in the housing 10 by a means which is to be described subsequently. Therefore, the flats 104 cooperate with the complemental bore in the said reel 102 loosely.

In order to prevent movement of the said reel 102 axially of the shaft 96, the brackets 106 and 108, respectively, are supplied in the housing 10 and are attached to the base or bottom 20 thereof. These brackets have bifurcated ends 110 and 112, respectively, which extend around the shaft 96 but are spaced therefrom. Adjacent the clutch element retaining end of the shaft 96 there is supplied a spring 112 or other equivalent resilient biasing means which bears against the bracket 100 and also against a suitable bar 114 which is attached to the shaft 96 by means of a suitable pin or the like. By this means, it is readily apparent that the shaft 96 is constantly biased in a single direction.

A brake element 116 of any suitable material such as cork, rubber, or certain types of metal is interposed between the bracket 100 and the clutch element 94. This brake element 116 may either be secured to one face of the clutch element 94 or directly to the bracket 100, as desired. Of course, it is now readily apparent from an inspection of Figure 5 that the said spring 112 will constantly bias the clutch element 94 (one face thereof) against the brake element 116, thereby maintaining the shaft in a locked position (relative to rotation) while in the normal position.

Figure 6:
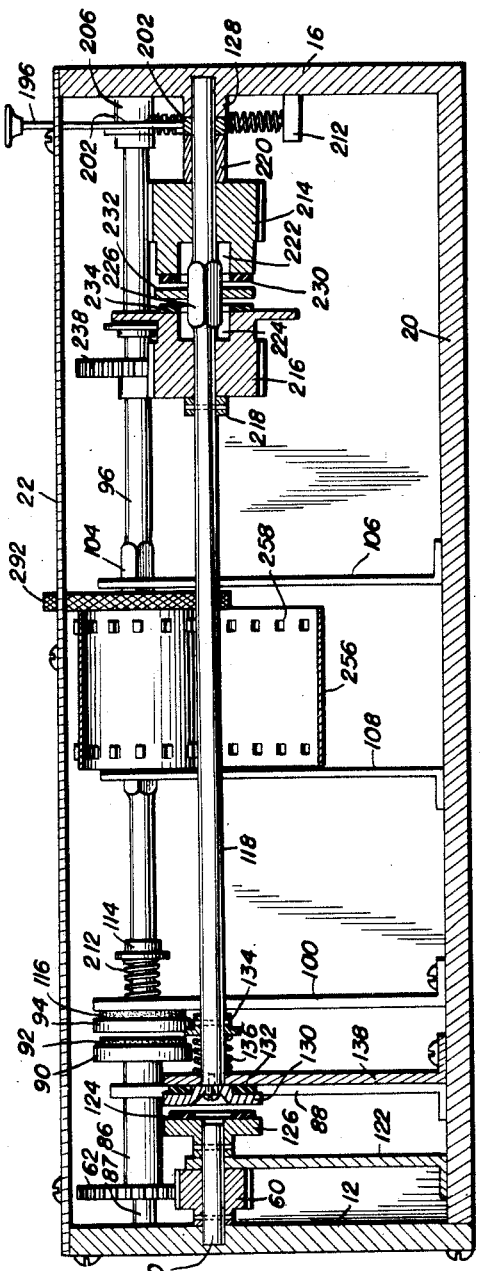
Figure 6 is a sectional view taken substantially on the line 6—6 of Figure 3.

Referring now to Figure 6, the means for journaling a second shaft 118 is illustrated in detail. The said gear 60 which is a portion of the said gear train is journaled on a suitable stub shaft 120, which is supported in the wall 12 and a bracket 122. Secured to the stub shaft 120 on the side of the bracket 122 opposite the said gear 20, is a clutch element 124 which is secured to a suitable boss 126. Of course, the said boss is rigidly connected with the stub shaft 120 by means of a pin or other suitable, equivalent fastening means.

The said shaft 118 is axially displaceable in the said housing, being mounted at one end in the wall 16, and more specifically in a boss 128 which is associated therewith. The opposite end of the shaft 118 has a clutch element 130 secured thereto and a brake element 132 secured thereto. The clutch element 130 cooperates with the aforementioned clutch element 124 for drivingly connecting the gear 60 with the shaft 118, and the opposite face of the said clutch element 130 cooperates with the brake element 132, thereby forming an effective friction brake or lock.

A conventional collar 134 is rigidly secured to the said shaft 118 by means of a suitable pin or the like and seats a spring 136 on the said shaft 118. The other end of the said spring 136 bears against a bracket 138 which is also utilized for journaling the said shaft 118. The function of this brake and clutch arrangement is identical to that described in connection with the shaft 96.

Attention is now directed to Figure 7, primarily, wherein a third shaft 140 is journaled in such a manner as to be axially displaceable. The gear 58 of the said train of gears is utilized for transmitting torque from the power shaft 40 to the stub shaft 142. The said stub shaft 142 is journaled in a suitable bore formed in the said wall 12 and also in a bracket 144. This last-mentioned bracket is, of course, rigidly secured to the said base or bottom 20 of the housing 10 by any suitable means such as soldering, welding, brazing, bolting or the like. A sleeve 146 is formed integral with the said gear 58 and a conventional pin joins the said sleeve, and consequently the gear 58, to the said stub shaft 142. Supplied at the terminal portion of the said stub shaft 142 and on the opposite side of the said bracket 144 (from the sleeve 146), is a boss 148. This boss has a clutch element 150 secured thereto for cooperation with a clutch element 152, which is secured to the terminal portion of the said shaft 140.

The said shaft 140 is journaled in a boss 154 which is formed integral with the said wall 14 and in a suitable aperture supplied in a bracket 158. A plurality of flats 160 are formed on the shaft 140 for cooperation with complemental bores in reels 162 and 164, respectively. It will be noted that two reels are associated with the said shaft 140 which are simultaneously actuated upon actuation of the said shaft 140. The means for limiting the axial travel of the reels 162 and 164, respectively, on the shaft 160 may be seen best in Figure 7 as the brackets 166, 168 and 170, 172 respectively which flank the reels.

Bifurcated end portions 174 are supplied on each of the said brackets 166, 168, 170 and 172 respectively in order to permit the said shaft 170 to extend therethrough without contact therewith.

The terminal of the shaft 140 adjacent the clutch element 150 is supplied with a clutch element or plate 176 which is attached by means of a suitable screw or the like. One face of this clutch element 176 cooperates with the above mentioned clutch element 150 for transmission of torque, while the other surface of the said clutch element 176 cooperates with a brake band or element 178. Of course, the said brake band 178 may be secured either to the clutch element 176 or directly to the bracket 158. The spring 180 seats on a suitable collar 182, which is secured to the said shaft 140, and also seats on the bracket 158. By this means, the entire shaft 140 is constantly resiliently biased axially in a selected direction, for normally urging the clutch element 152 against the brake element 178, thereby locking the shaft in a selected position.

By the aforementioned and described structure the operation of the invention thus far may be seen as transmitting torque from the motor 38 through the gear train, thence to a plurality of stub shafts and the sleeve 86. The transmitted torque may then be applied to the shafts 96, 118, or 140. Further, excessive or undesired rotation of these shafts may be prevented and is prevented automatically by means of the braking arrangement described in connection with each of the clutch assemblies.

Figure 2:
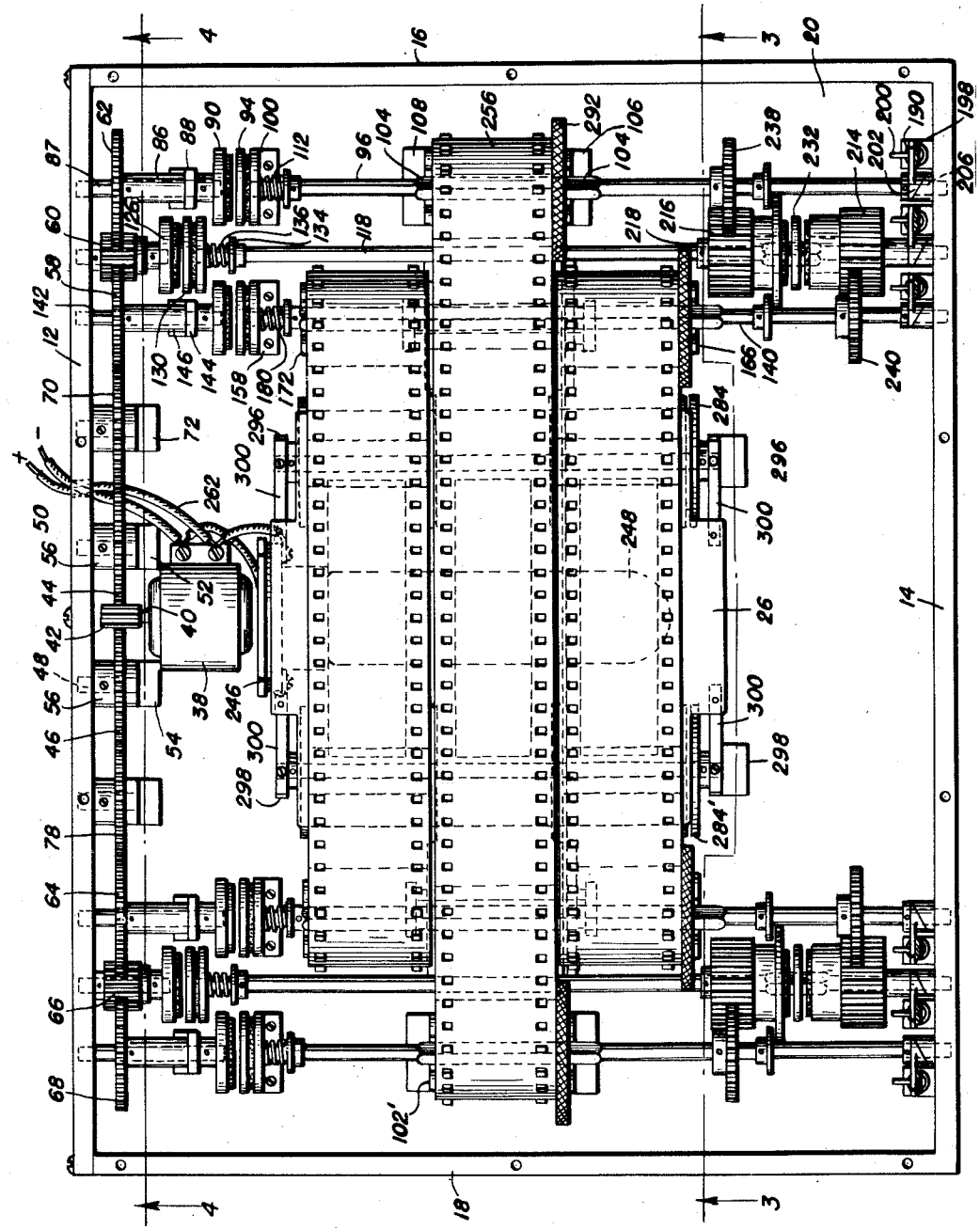
Figure 2 is a plan view of the invention shown in Figure 1, the cover having been removed.

Inspection of Figure 2 clearly illustrates the duplicity of the structure including shafts 96, 118 and 140. As described in connection with the gear train, the counter shafts (shafts opposite from the described shafts) rotate in directions opposite to the rotation of the described shafts 96, 118 and 140.

Reference is now made to Figures 9 and 10 wherein the means for axially displacing the shafts 96, 118 and 140 is partially illustrated. Riding on each of the shafts 96, 118 and 140 is an eccentric 190 having slots 192 formed therein. Actuation bars 194, 196 and 198, respectively, are reciprocably received through suitable slots in the said cover 22 of the housing 10. Pins 200 are rigidly secured to each actuating bar and seat in the said slots 192. By reciprocation of the actuating bars 194, 196 and 198, respectively, the eccentric 190 which is appurtenant to the shaft desired to be displaced is urged. By this means, a collar 202 is pushed, carrying with it the pertinent shaft. The collar 202 is pinned to the pertinent shaft and the said eccentric 190 rides freely on the shaft. One edge of the said eccentric 190 is formed with a cam surface 204 which is cooperative with a stationary cam 206. The said stationary cam is rigidly attached to the wall 14, thereby urging the said shaft 140 axially in order to compress the pertinent spring 180, thereby engaging the pertinent clutch plates and deriving torque from the motor 38.

Inspection of Figure 9 discloses a notch 199 in the bar 196 engageable with the top cover 22, after movement of the three scales to procure a fine adjustment. It should be placed at a position on the bar 196 such that the clutch 130 has disengaged but not so far that the clutch 232 (described subsequently) uncouples shafts 140 and 96 before fine adjustment is made. Thereafter the bar is returned.

In order to return the actuation rod or bars, each is supplied with a lug 208 which has a spring 210 seated thereon. The opposite end of the said spring is attached to a perch 212 which is secured to the side 14 of the housing 10. By this means, upon reciprocation of the actuating bars, the springs associated therewith will be compressed and released. As the shafts 96, 118 and 140 are slidably displaced in the housing 10, the pins 200 simply ride in the slots 192.

Referring now primarily to Figure 6 wherein the construction and mounting of the shaft 118 is illustrated, it will be noted that a pair of spaced gears 214 and 216 are supplied on this shaft. The said gear 216 is held in position by means of the collar 218, while the gear 214 has a thrust bearing 220 thereadjacent. This thrust bearing also bears against the collar 202 which is a portion of the cam actuation mechanism for the shaft 118. Said gear 214 is slidably positioned on the said shaft 218 and has a recess 222 formed therein. A similar recess 224 is formed in the said gear 216 in order to accommodate the flats 226 of the said shaft 118. Upon actuation of the bosses having cam surfaces described above in connection with the shaft 118, the thrust bearing 220 is urged axially of the shaft 118, thereby forcing the gear 214 in a selected direction. A clutch element 230 is secured to one face of the gear 214 for cooperation with a disk 232 driven by the flats of the said shaft 118. A clutch element 234 is secured to one face of the said gear 216 which comes into contact with the disk 232 for the transfer of torque from the shaft 118 to the gear 214 and the gear 216 after the clutch 130 engages the clutch element 124.

Referring now primarily to Figure 2, it will be seen that rotational movement of the shaft 118 imparts rotational movement to a gear 238 which is rigidly secured to the said shaft 96. Further, the rotation of the gear 214 is imparted to a gear 240 which is rigidly secured to the said shaft 140. Due to the flanking positions of the shafts 96 and 140 relative to the said shaft 118, the motion or movement of the shaft (rotational) 118 is imparted to the shafts 96 and 140 in the same directions. Of course, the reels on each of the shafts are correspondingly rotated, since the reels are secured to the shafts by means of the above described flats which obviate relative rotational movement between the shafts and the reels.

Figure 12:
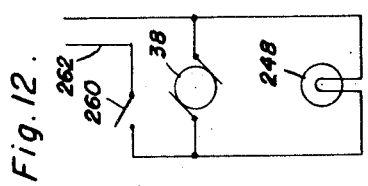
Figure 12 is a wiring diagram illustrative of the electrical circuit utilized in the invention.

Referring now primarily to Figure 8, a bracket 244 is illustrated as being attached to the base 20 and has a lamp socket 246 attached thereto. A conventional lamp 248 is fitted in the said socket and is adapted to underlie the window 34. It may be seen from this figure that the window plate 28 is positioned immediately beneath the window glass or other transparent material and a plurality of flanges 249 and 250 are adapted to engage the under surface of the transparent material 34. Fitted between these flanges are three tapes 252, 254 and 256, respectively. These tapes are of transparent material and have indicia comparable to that indicia found on slide rules thereon. Of course, the conventional tape of this nature is provided with a plurality of equally spaced apertures 258 therein which are engageable with conventional protuberances at spaced intervals around each of the said reels. Referring now to Figure 12, the wiring of the system is shown in diagrammatic form. A suitable switch 260 is provided in an appropriate place in the line 262, which conducts current to the motor 38 and the lamp 248. Upon actuation of the single switch 260, it is readily appreciated that the motor 38 will be rendered operative as the lamp 248 will be permitted to supply the proper illumination.

An exact duplicate of the shaft construction including the pertinent reels is supplied on opposite sides of the lamp and socket, whereby the reels and tapes pertinent thereto may be actuated in opposite directions.

The said tape 256 extends over the reel 162 and is stored on a reel 270 (see Fig. 7). The said reel 270 is journaled in the brackets 170 and 168 and on a suitable stub shaft 272 which is received in suitable apertures therein. The said tape 256 travels beneath the window 34, extending over a reel 162' and finally to a storage reel 270'.

A drum 280 is formed on the said reel 270 and has a cord, small cable or very flexible wire 282 wound therearound. This cord is also wound around a suitable drum supplied on the said reel 270' to prevent excess unwinding of the tape 256 upon abrupt actuation of the reels and also to wind the tape on the reels. By pulling tape out of one reel, the wire winds and the wire and tape are wound in opposite directions. This action pulls wire from the opposite reel, which in turn winds the film on that reel, therefor unwinding on the opposite reel and by so doing winds tape upon the opposite reel. Of course, the cord 282 is wound from one reel 270 to the other reel 270', and conversely during the actuation of the invention.

The said tape 254 as well as the said tape 252 are journaled over the suitable reels described in connection with the shaft 140. These reels 164 and 162 have their respective tapes journaled thereover, extending from storage rolls 284 and 284'. Drums 286 are integrally associated with the said storage reels 284 and 284' and a cable or cord 288 couples the said storage reels. The function of this cable is similar to the said cable 282 and prevents excess movement of the drums and reels upon abrupt and rapid actuation of the invention.

The said shafts 96 and 140, as well as their counter-shafts, are supplied with knurled knobs 292 and 294, respectively, which extend through suitable slots formed in the said cover 22. These knobs are used, of course, for over riding the brake mechanisms supplied in association with the pertinent shafts 96 and 140 in order to obtain fine adjustments of the reels, and more important, the tapes associated with the reels.

Figure 3:
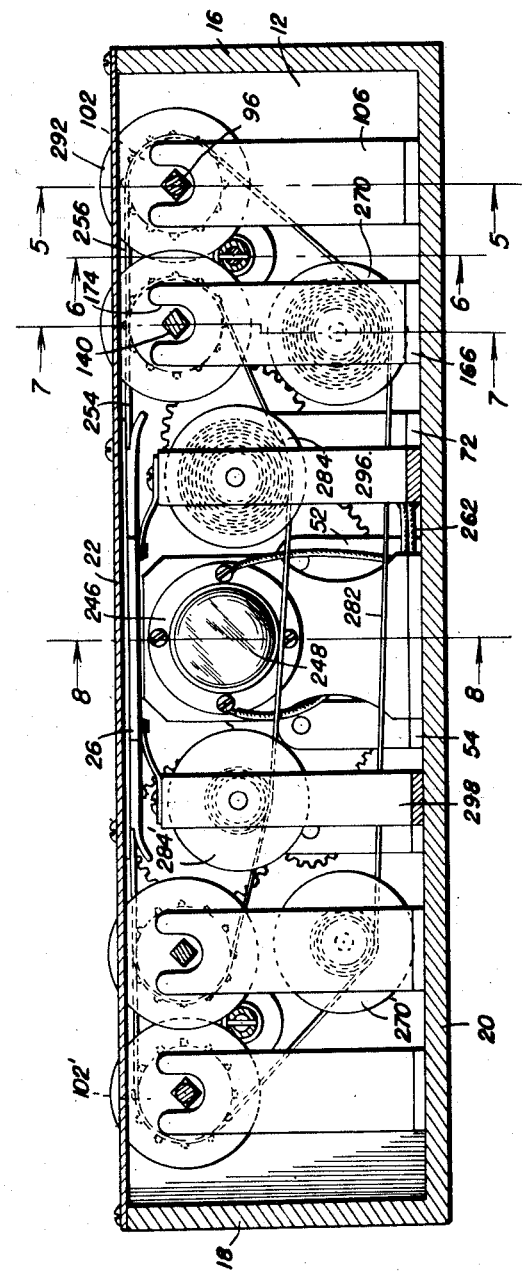
Figure 3 is a sectional view taken on the line 3—3 of Figure 2 and in the direction of the arrows.

Referring now to Figures 2 and 3, it will be seen that the reels having the drums thereon for winding and winding the cable 288 may be journaled in pairs of brackets 296 and 298, respectively. These brackets may also have fingers 300 extending therefrom which fasten the window plate 26 in place or in position beneath the transparent member 34.

In operation, it is believed readily apparent that the tapes may be manipulated to various positions by actuation of the appropriate knobs or buttons. When one of the actuation buttons 196 is urged, the thrust bearing 220 (see Fig. 6) moves the gear 214 against the disk 232 and the disk against the clutch 234, thus locking these two gears to the shaft 118 and causing shafts 96 and 140 to rotate, which in turn will pull both inside and outside tapes in the same direction without any slippage between the tapes. This is equivalent to performing the action of a conventional slide rule in moving the slide. By selective manipulation of buttons, it is readily appreciated that the following movements may take place: Moving the inside tape in either direction independently of the outside tapes, moving the two outside tapes together in either direction independently of the inside tape, and coupling the inside and outside tapes together and moving all three tapes in either direction.

Attention is now directed to Figure 5 and also Figure 2. It will be noted that the collars on the shaft 96 and shaft 140 are pushed by the large flange on the gear 216 a sufficient amount to unseat these shafts from their brake shoes but not enough to engage their clutches. This construction is utilized in order to permit efficient and proper actuation of the motor.

From the foregoing, the operation of the structure of the present invention is deemed readily apparent. It is understood, however, that minor variations may be made without departing from the spirit of the invention.

Having described the invention, what is claimed as new is:

1. In a calculator of the slide rule type, a housing, a first tape and a second tape having cooperating graduations, means for journalling said tapes in said housing, means for actuating said tapes, and selective means for controlling the actuation of the first tape and both of said tapes simultaneously, said tape actuating means including a train of gears journaled in said housing, means for actuating the gear train, and clutches associated with said gear train, said tape journalling means comprising a plurality of shafts having reels thereon, said shafts being slidably mounted in said housing for operative engaging and disengaging of said clutches, said selective actuation means comprising juxtaposed sets of cams associated with said shafts for axially displacing said shafts, and means for moving said sets of cams relative to each other.

2. In a calculator of the slide rule type, a housing, a first tape and a second tape having cooperating graduations, means for journalling said tapes in said housing, means for actuating said tapes, and selective means for controlling the actuation of the first tape and both of said tapes simultaneously, said tape actuating means including a train of gears journaled in said housing, means for actuating the gear train, and clutches associated with said gear train, said tape journalling means comprising a plurality of shafts having reels thereon, said shafts being slidably mounted in said housing for operative engaging and disengaging of said clutches, said selective actuation means comprising juxtaposed sets of cams associated with said shafts for axially displacing said shafts, and means for moving said sets of cams relative to each other, selected reels having drums secured thereto, a cord entrained over said drums for preventing non-synchronous movement thereof.

3. A calculator of the slide rule type including a housing having a gear train mounted therein, means for actuating said gear train, clutch elements associated with selected gears of said gear train, shafts, means mounting said shafts in said housing for rotative and axial movement, clutch elements secured to said shafts, cam means for axially displacing said shafts to operatively engage said clutch elements, reels secured to said shafts having indicia bearing tapes thereon, an opening in said housing for vision of the tapes, a first of said shafts having a reel with a tape thereon, a second of said shafts with a pair of spaced reels having tapes thereon, all of said tapes having cooperating indicia thereon, and a third of said shafts including means for rotating the first and second shafts.

JOHN LAURENCE TAAFFE.

REFERENCES CITED

The following references are of record in the file of this patent:

UNITED STATES PATENTS

| Number | Name | Date |
|---|---|---|
| 1,068,982 | Connio | July 29, 1913 |
| 1,371,076 | Dicken | Mar. 8, 1921 |
| 1,548,208 | Reisiger | Aug. 4, 1925 |
| 1,597,112 | Rymal | Aug. 24, 1926 |
| 1,777,692 | Fuss | Oct. 7, 1930 |
| 2,143,892 | Ludecke et al. | Jan. 17, 1939 |
| 2,451,784 | Tellander | Oct. 19, 1948 |

FOREIGN PATENTS

| Number | Country | Date |
|---|---|---|
| 471,113 | Germany | Feb. 9, 1929 |

OTHER REFERENCES

Figure 203, on page 27 of "The Engineer's Sketch-Book," 6th ed., by Thomas Walter Barber, published by E. and F. N. Spon of 57 Haymarket, S. W., 1, London, England in 1938.